(12) United States Patent
Klix et al.

(10) Patent No.: US 6,525,113 B2
(45) Date of Patent: Feb. 25, 2003

(54) PROCESS FOR PRODUCING CROSS-LINKED POLYALLYLAMINE HYDROCHLORIDE

(75) Inventors: Russell C. Klix, Buffalo Grove, IL (US); Jufang H. Barkalow, Deerfield, IL (US); William T. Monte, Lincolnshire, IL (US)

(73) Assignee: Abbott Laboratories, Abbott Park, IL (US)

(*) Notice: Subject to any disclaimer, the term of this patent is extended or adjusted under 35 U.S.C. 154(b) by 0 days.

(21) Appl. No.: 09/902,334

(22) Filed: Jul. 11, 2001

(65) Prior Publication Data

US 2001/0041756 A1 Nov. 15, 2001

Related U.S. Application Data

(63) Continuation of application No. 09/293,551, filed on Apr. 16, 1999, now abandoned.
(60) Provisional application No. 60/043,251, filed on Apr. 16, 1997.

(51) Int. Cl.$^7$ .............................. C08K 3/20; C08L 63/02
(52) U.S. Cl. ..................... 523/411; 523/461; 524/555; 524/812; 525/328.2; 525/359.3; 525/385

(58) Field of Search ................................ 523/411, 461; 524/555, 812; 525/328.2, 359.3, 385

(56) References Cited

U.S. PATENT DOCUMENTS

| 5,496,545 A | * | 3/1996 | Holmes ................ 424/78.11 |
| 5,589,166 A | | 12/1996 | McTaggart et al. |
| 5,607,669 A | | 3/1997 | Mandeville, III et al. |
| 5,618,530 A | | 4/1997 | Mandeville, III et al. |

FOREIGN PATENT DOCUMENTS

| WO | 9534585 | 12/1995 |
| WO | 9621454 | 7/1996 |

\* cited by examiner

Primary Examiner—Robert Dawson
Assistant Examiner—D. Aylward
(74) Attorney, Agent, or Firm—Michael J. Ward

(57) ABSTRACT

The present invention relates to a process for preparing a cross-linked pollyallyamine hydrochloride. The process involves mixing polyallylamine hydrochloride, water, a hydroxide or alkoxide, and a water-miscible organic solvent or co-solvents, to a reaction mixture and adding a cross-linking agent to the reaction mixture to form a cross-linked polyallylamine.

16 Claims, No Drawings

PROCESS FOR PRODUCING CROSS-LINKED POLYALLYLAMINE HYDROCHLORIDE

This application is continuation of Ser. No. 09/293,551, Apr. 16, 1999, abandoned which claims benefit of provisional application No. 60/043,251, Apr. 16, 1997

TECHNICAL FIELD OF THE INVENTION

The present invention relates to a process for preparing a functionalized polymer. More specifically, the present invention relates to a process for preparing cross-linked polyallylamine hydrochloride.

BACKGROUND OF THE INVENTION

Functionalized polymers find many uses in the art such as drugs, ion exchange resins and chelating resins. Functionalized polymers are prepared by introducing various types of functional groups into insoluble polymers. The polymer to be used as a base for the production of a functionalized polymer should be one that is capable of containing several different types of functional groups that are capable of reacting with many different kinds of compounds. Preferably, the polymer will contain electrophilic or nucleophilic functional groups. An example of a polymer having an electrophilic functional group is chloromethylated polystyrene. Examples of polymers having nucleophilic functional groups include polyacrylic acid wherein the functional group is —COOH, polyvinyl alcohol wherein the functional group is —OH, polyethyleneimine wherein the functional group is —NH—, polyvinylamine wherein the functional group is —NH$_2$—, and the like.

U.S. Pat. No. 4,605,701 (the '701 patent) describes a process for preparing a cross-linked monoallylamine polymer. The method involves dispersing a solution of monoallylamine polymer in an aqueous solvent and then into a liquid medium that is immiscible with the aqueous solvent. This is followed by subjecting some of the amino groups present in the polymer to a cross-linking reaction with formaldehyde or a compound having at least two functional groups reactive with the primary amino group. According to the '701 patent, the liquid medium is usually an halogenated or unhalogenated aliphatic or aromatic hydrocarbon such as carbon tetrachloride, trichlorethylene, dichloromethane, tetrachloroethylene, chlorobenzene, dichlorobenzene, benzene, toluene, xylene and the like.

One of the difficulties with the process for preparing a cross-linked monoallylamine polymer as described in the '701 patent is that this process employs aliphatic or aromatic hydrocarbons for use as the liquid medium. Such hydrocarbons may be hazardous and expensive to dispose of. Another difficulty with the process described in the '701 patent is that the polymerization process results in a voluminous batch due to the swelling of the gel and necessitates the use of a number of reaction vessels making the process difficult and expensive.

Therefore, there is a need in the art for a solution process of preparing cross-linked functional polymers, such as polyallylamine hydrochloride, in which the process employs environmentally friendly materials and the polymerization occurs in a single reaction vessel in order to facilitate commercial production of the polymer.

The present invention relates to a solution process for preparing a functionalized polymer. More specifically, the present invention involves a process for preparing cross-linked polyallylamine hydrochlorides using environmentally preferable materials. The process of the present invention does not employ aliphatic or aromatic hydrocarbons that may be hazardous and expensive to dispose of. The process of the present invention controls the swelling of the cross-linked polyallylamine polymer in a single reaction vessel that facilitates commercial production of the polymer.

SUMMARY OF THE INVENTION

The present invention relates to a solution process for producing cross-linked polyallylamine and its salts. In particular, the process of the present invention involves mixing polyallylamine hydrochloride, water, a hydroxide or alkoxide, and a water-miscible organic solvent or co-solvents, in a reaction vessel, and then adding a cross-linking agent.

DETAILED DESCRIPTION OF THE INVENTION

The solution process of the present invention involves adding polyallylamine and/or its salt forms and water to a reaction vessel to form a reaction mixture. The polyallylamine hydrochloride preferably has a molecular weight of from about 1000 to about 500,000, more preferably from about 5,000 to about 30,000. Polyallylamine hydrochloride is commercially available from Nitto Boseki Company, LTD., Tokyo, Japan and Salbury Chemical, Inc., Charles City, Iowa. Also, polyallylamine hydrochloride can be synthesized from monoallylamine and concentrated hydrochloric acid as described in U.S. Pat. No. 4,605,701, herein incorporated by reference.

The polyallylamine used in the process of the present invention can be in any form known in the art, such as in solid or aqueous form. Solid forms of polyallylamine may be reconstituted with water. Various salt forms of polyallylamine may be used as well, and in particular, the hydrochloride salt form may be illustrative of the present invention. Preferably, the polyallylamine hydrochloride is added to the reaction vessel in the form of an aqueous solution. When an aqueous solution of polyallylamine hydrochloride is used, it is from about 25% to about 75% aqueous, preferably about 50% aqueous.

The water added to the reaction vessel is preferably distilled water. The weight ratio of water (kg) to pollyallylamine hydrochloride (kg, dry weight) is from about 1.5:1.0 to about 10.0:1.0, preferably from about 1.5:1:0 to about 5.0:1.0.

After the pollyallylamine hydrochloride and water are added to the reaction vessel, the resulting reaction mixture is mixed for a time period of from about 15 minutes to about is 90 minutes. After the mixing, a hydroxide or alkoxide is added to reaction mixture. Examples of hydroxides that can be used in the present invention are potassium hydroxide, calcium hydroxide, sodium hydroxide, lithium hydroxide, and the like. Examples of alkoxides that can be used in the process of the present invention are sodium methoxide, sodium ethoxide, sodium tert-butoxide, potassium methoxide, potassium ethoxide, potassium tert-butoxide, and the like. The weight ratio of hydroxide or alkoxide (kg) to polyallylamine hydrochloride (kg, dry weight) is from about 0.1:1.0 to about 10.0:1.0, preferably from about 0.3:1.0 to about 5.0:1.0.

After the hydroxide or alkoxide is added to the reaction mixture, the reaction mixture is stirred for a time period of from about 30 minutes to about 120 minutes. After stirring, the reaction mixture is allowed to cool to a temperature of from about 15° C. to about 40° C., preferably from about 20° C. to about 30° C.

After the reaction mixture has cooled, a water-miscible organic solvent is added to the reaction mixture. The solvent displaces the water out of the polallylamine particles to allow for further processing. The water-miscible solvent can be an aprotic or a protic solvent. Water-miscible aprotic or protic solvents that can be used in this invention are well known in the art and include, but are not intended to be limited to, alcohols, dimethylformamide, tetrahydrofuran, dimethyl sulfoxide, acetonitrile. A prefered water-miscible aprotic solvent that can be used in the process of the present invention is acetonitrile. A preferred water-miscible protic solvent that can be used in the process of the present invention is alcohol. Alcohols suitable for the present invention include isopropanol, methanol, ethanol, butanol, and the like. A more preferred water-miscible protic solvent that can be used in the process of the present invention is isopropanol. The volume ratio of water-miscible solvent to water in the reaction mixture may be from about 0.5:1.0 to about 10.0:1.0, preferably from about 1.5:1.0 to about 5.0:1.0.

It is to be understood that co-solvents may be added to the reaction mixture instead of the use of a single solvent. For example, aprotic and protic solvents may be used together in the process to achieve the same purpose. Furthermore, the order of adding the above reactants to the reaction mixture is not critical to the present invention. For example, the hydroxide or alkoxide may be added to the reaction vessel first followed by addition of polyallylamine, water, and solvent. However, the polyallylamine, water, hydroxide or alkoxide, and solvent or co-solvents must be added prior to the addition of the cross-linking agent.

After the addition of the above reactants to the reaction mixture, a cross-linking agent is added to the reaction mixture to cross-link the amino groups of the polyallylamine hydrochloride. The cross-linking agent can be any compound that contains at least two functional groups that are reactive with the amino groups of the polyallylamine hydrochloride. As used herein, the term "functional group" refers to the center of reactivity in a molecule. The functional groups contained in the cross-linking agent can be halogen groups, epoxy groups, carboxyl groups, hydroxy groups and the like. For example, the cross-linking agent can be epichlorohydrin or 1,3-dichloro-2-propanol. A single cross-linking agent or multiple cross-linking agents can be used in the process of the present invention to cross-link the pollyallylamine hydrochloride. The weight ratio of cross-linking agent to polyallylamine hydrochloride in the reaction mixture is from about 0.01:1.0 to about 10.0:1.0. After the addition of the cross-linking agent, the reaction mixture may be stirred and the reaction mixture begins to form a suspension of poyallylamine particles. After completion of the stirring, the suspension of particles may be recovered by filtering. The reaction vessel may then be washed with a water-miscible organic solvent, such as acetonitrile or isopropanol, in order to remove any residual solids. The collected solids can then be washed with distilled water and a water-miscible organic solvent. Any water-miscible solvent can be used such as acetonitrile or isopropanol. The solids can then be dried using any technique known in the art. For example, the solids can be dried under a vacuum. After drying, a cross-linked polyallylarnine hydrochloride is recovered.

The cross-linked polyallylamine hydrochlorides of the present invention may be used to selectively bind phosphates, transition metals, ionic complexes, and the like. For example, pharmacuetically acceptable cross-linked polyallylamine may be used to remove phosphates in the lumen in patients suffering from renal failure.

EXAMPLE 1

Preparation of a Cross-linked Polyallylamine Hydrochloride

To a 30 gallon glass lined reactor was added 14.8 kg of polyallylamine hydrochloride solution (50% aqueous) and 22.2 kg of distilled water. The contents were mixed for about 15 minutes. To this solution was added 2.26 kg of sodium hydroxide and the mixture was stirred for about 30 minutes until the sodium hydroxide was dissolved. After the solution was allowed to cool to 20° C.–30° C., 36.8 kg of acetonitrile followed by 696 grams of epichlorohydrin were added. The reaction mixture was then stirred for not less than 21 hours at room temperature. A suspension of particles occurred at around 2 hours. The slurry was then filtered and the reactor was washed with 10 kg of acetonitrile to remove any residual solids. The collected solid was washed with 109.8 kg of distilled water and 249 kg of 70% aqueous isopropanol to obtain a final conductivity of 0.09 m Siemen/cm. The product was then dried under a vacuum with a moist air bleed at 55° C. to afford 5.9 kg of the final product.

What is claimed is:

1. A solution process for producing a cross-linked polyallylamine or a salt form thereof, the process comprising the steps of:

a). mixing polyallylamine, water, a hydroxide or alkoxide, and a water-miscible organic solvent or co-solvent; and b). adding a cross-linking agent to form a cross-linked polyallylarnine.

2. The process of claim 1 wherein the weight ratio of water to polyallylamine in the reaction mixture is from about 1.5:1.0 to 10.0:1.0.

3. The process of claim 1 wherein the hydroxide is selected from the group consisting of sodium hydroxide, calcium hydroxide, potassium hydroxide, and lithium hydroxide.

4. The process of claim 1 wherein the alkoxide is selected from the group consisting of sodium methoxide, sodium ethoxide, sodium tert-butoxide, potassium methoxide, potassium ethoxide, and potassium tert-butoxide.

5. The process of claim 1 wherein the weight ratio of hydroxide or alkoxide to pollyallylamine in the reaction mixture is from about 0.1:1.0 to about 10.0:1.0.

6. The process of claim 1 wherein the water-miscible organic solvent is an aprotic solvent.

7. The process of claim 1 wherein the cross-linked polyallylamine is recovered by filtration.

8. The process of claim 6 wherein the water-miscible aprotic solvent is acetonitrile.

9. The process of claim 1 wherein the water-miscible organic solvent is a protic solvent.

10. The process of claim 9 wherein the water-miscible protic solvent is isopropanol.

11. The process of claim 1 wherein the volume ratio of water-miscible organic solvent to water in the reaction mixture is from about 0.5:1.0 to about 10.0:1.0.

12. The process of claim 1 wherein the cross-linking agent is a compound which has at least two functional groups which are reactive with the amino groups of the polyallylamine.

13. The process of claim 12 wherein the functional groups are selected from halogen group, epoxy group, carboxyl group, or hydroxyl group.

14. The process of claim 12 wherein the cross-linking agent is selected from the group consisting of epichlorohydrin and 1,3 dichloro-2-propanol.

15. The process of claim 1 wherein the weight ratio of cross-linking agent to polyallylamine in the reaction mixture is from about 0.01:1.0 to about 10.0:1.0.

16. The process of claim 1 wherein the polyallylamine is the hydrochloride salt form.

* * * * *

UNITED STATES PATENT AND TRADEMARK OFFICE
CERTIFICATE OF CORRECTION

PATENT NO. : 6,525,113 B2 Page 1 of 1
DATED : February 25, 2003
INVENTOR(S) : Russell C. Klix, Jufang H. Barkalow and William T. Monte It is certified that error appears in the above-identified patent and that said Letters Patent is hereby corrected as shown below:

<u>Column 4,</u>
Line 24, delete "polyallylarnine" and insert -- polyallylamine --.

Signed and Sealed this

Thirteenth Day of May, 2003

JAMES E. ROGAN
*Director of the United States Patent and Trademark Office*